Figure 1:
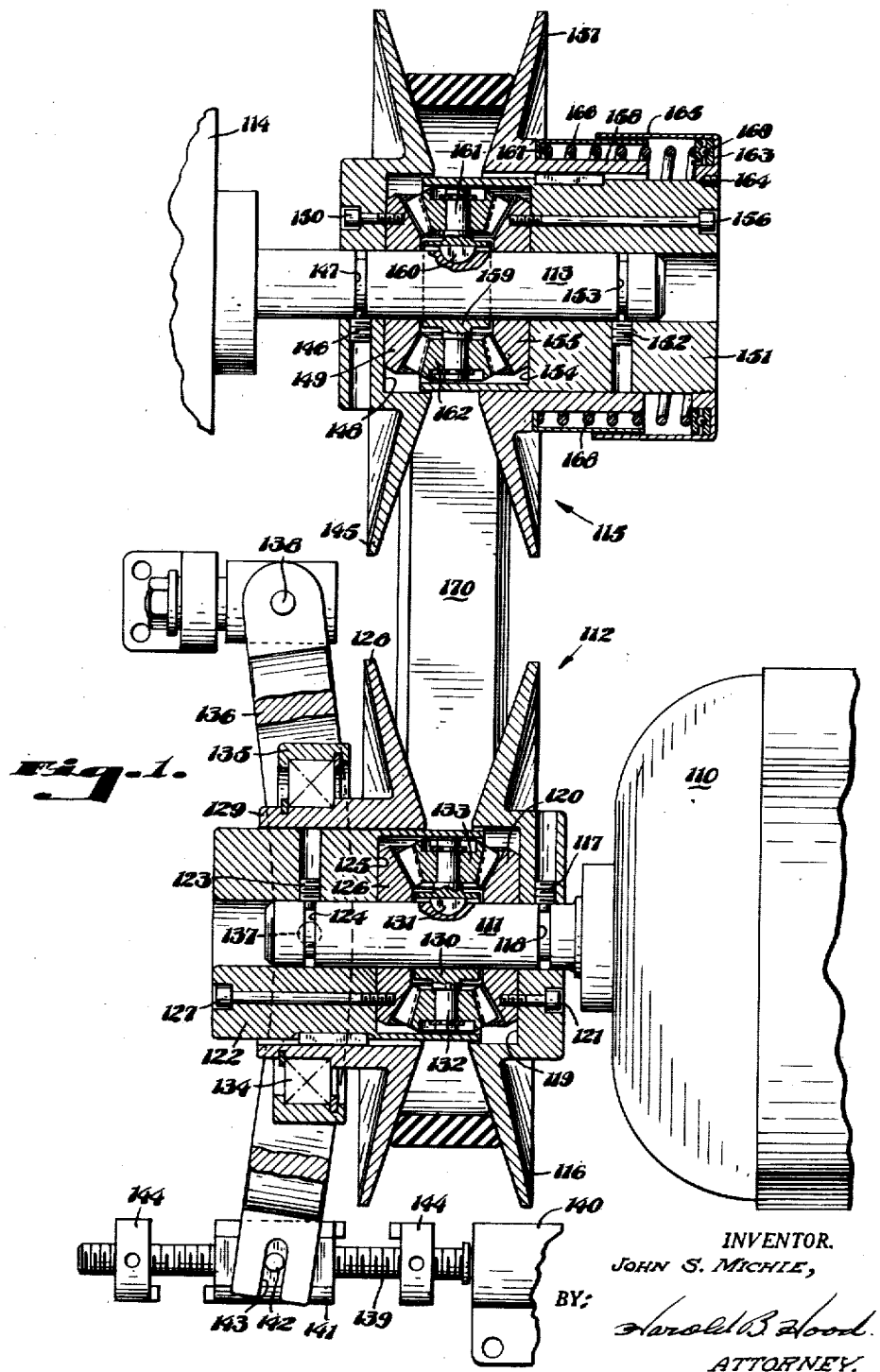

INVENTOR.
JOHN S. MICHIE,
BY: *Harold B. Hood*
ATTORNEY.

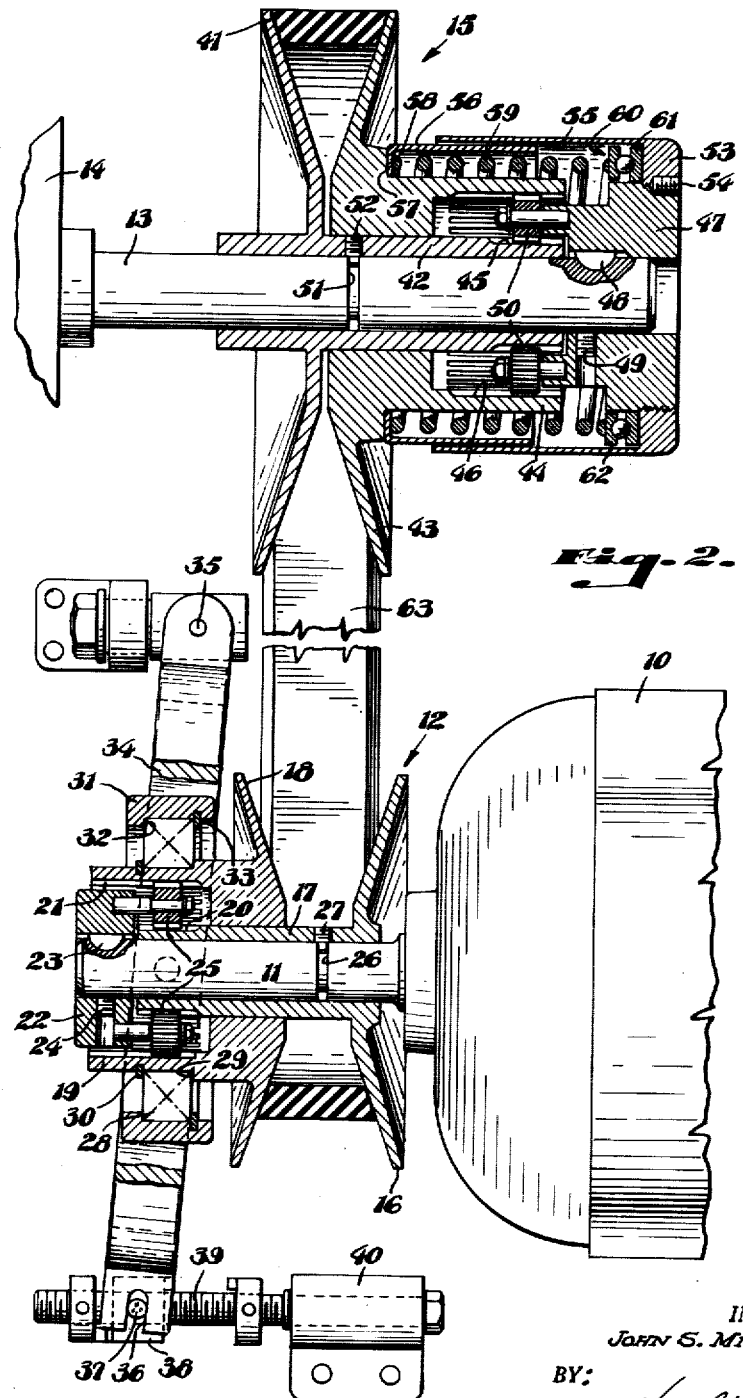

United States Patent Office 2,803,143
Patented Aug. 20, 1957

2,803,143

EXPANSIBLE V-PULLEY WITH VARIABLY DRIVEN ELEMENTS AND SPEED VARYING DRIVE

John S. Michie, Columbus, Ind., assignor, by mesne assignments, to The Reliance Electric and Engineering Company, Cleveland, Ohio, a corporation of Ohio Application January 25, 1954, Serial No. 405,954

18 Claims. (Cl. 74—230.17)

The present invention relates to variable speed drives of the expansible V-pulley type, and is particularly concerned with a novel expansible V-pulley in which the elements of the pulley are variably driven. In the specific embodiment of the invention illustrated, the mating discs of the pulley are coaxially mounted upon a shaft, said discs being drivingly connected with the shaft and with each other through planetary gear means; but as the description of the invention proceeds, it will be perceived that other specific means might be provided for establishing such a working connection between the mating discs as to permit relative rotational movement between the discs, without loss of driving effect.

Conventionally, in speed-varying drives of the expansible V-pulley type, the V-belts used are wider than those used in constant ratio, V-belt drives. It has long been known that the power-transmitting efficiency of such a speed-varying unit, using such a relatively wide belt, is less than theoretically should be expected. For instance, an empirical formula has been evolved to express the power-transmitting capacity of a V-belt of known physical characteristics, in which the variable factors are cross-sectional area of the belt, pitch diameter and angle of inclination of the sides of the belt, area of contact, and spring pressure. While this formula applies with consciderable accuracy to V-belt drives between V-pulleys of fixed effective diameters, it has long been known that the actual power transmitting capacity of a transmission including expansible V-pulleys and such a wide V-belt is only approximately 50% of the capacity indicated by the above formula. The reasons for this condition have long been a mystery in the art.

I have reached the conclusion that the deficiency of capacity of such transmissions is due primarily to what may be termed "bucking" within the body of the belt, resulting in part from belt misalignment which inevitably results from adjustments in some types of transmissions, and in part from minor inaccuracies in the construction of the transmission parts. Absolute accuracy in the machining of the coned face of a pulley disc to a theoretical angle, is of course, impossible; and when two such discs are used in mating relation, it is entirely possible that opposite inaccuracies may occur, at a common pitch diameter of the mating faces of the two discs. In such a situation, of course, it is entirely possible that one side of the belt may ride outside the theoretical pitch diameter while the other side may ride inside the theoretical pitch diameter, thereby multiplying the effect of the inaccuracy in disc face form. When such a condition arises, of course, one side of the belt tends to run substantially ahead of the other side of the belt; thereby creating serious stresses within the belt body and, necessarily, producing slip between the belt and at least one face of the pulley. I am convinced that power losses, arising in this way, are responsible for the poor efficiency of such transmissions which, though it has long been recognized, has not heretofore been cured in this art.

My conclusions are fortified by experiments which have been made with a transmission involving pulleys constructed in accordance with the disclosures of my pending application Serial No. 378,553 filed September 4, 1953, for Keyless Resiliently Expansible V-Pulley. The power transmitting capacity of a V-pulley type of variable transmission embodying such keyless expansible pulleys is, at certain speeds, substantially greater than the capacity of corresponding systems in which the mating discs of the pulleys are keyed to each other. But obviously, in such a transmission, power can be transmitted to or from the shaft on which such a pulley is mounted only through the fixed disc. Since the fixed disc on one shaft, in such a transmission, always engages one side of the belt while the fixed disc on the other shaft engages the opposite side of the belt, it will be obvious that losses of efficiency must arise in a transmission involving such keyless expansible V-pulleys. If, now, the shiftable disc of each pulley can be caused to participate in the drive, without producing the "bucking" tendencies above mentioned, the power transmitting capacity of the assembly should be doubled; and I have found that to be substantially true.

According to the present invention, then I propose to provide, in such a transmission, pulleys in which both mating discs of such a pulley will be effective for the transmission of power between the belt and the shaft on which the pulley is mounted, but in which the separate discs shall be free for relative rotational movement to compensate for such inequalities as result, for instance, from the inaccuracies above enumerated.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a somewhat diagrammatic illustration of a power transmission assembly of the expansible V-pulley type embodying a preferred form of means for providing the driving capacity above suggested; and Fig. 2 is a similar view of such a transmission embodying a modified form of means within the scope of my invention.

In Fig. 1, I have shown, a fragmental elevation, a part of a motor 110 provided with a spindle 111 upon which is supported an expansible V-pulley indicated generally by the reference numeral 112. A driven shaft 113, which may be an element of a machine 114 of any type, carries a resiliently expansible V-pulley, indicated generally by the reference numeral 115. The pulleys 112 and 115 are constructed in accordance with the present invention, and will now be described in detail.

The pulley 112 comprises a coned disc 116 carrying, in its hub portion, a screw 117 whose reduced nose is received in an annular groove 118 in the spindle 111, whereby the disc 116 is restrained against axial reciprocatory movement relative to the spindle 111, but is free for rotational movement relative thereto. Centrally of its coned face, the disc 116 is formed with a coaxial socket 119 in which is received a bevelled gear 120, fixedly secured therein by means of one or more headed machine screws 121.

A hub element 122 is similarly mounted on the spindle 111, said element being formed to receive a screw 123 whose reduced nose is positioned in an annular groove 124 formed in the spindle 111, whereby the hub element 122 is restrained against axial movement relative to the spindle, but is free for rotational movement relative thereto. That end of the hub element 122 adjacent the disc 116 is formed with a coaxial socket 125 defining a transaxial surface presented toward the disc 116. A beveled gear 126 is received in the socket 125, and is secured in place therein by one or more headed machine screws 127.

A second coned disc 128 is supported upon the hub element 122 for reciprocation relative thereto toward and away from the disc 116. Said disc 128 is provided with a rearwardly elongated hub portion 129 whose axial extent is at least equal to the length of its reciprocatory path, relative to the hub element 122, and which has bearing upon said hub element 122 substantially throughout its length. The disc 128 is keyed or splined to the hub element 122, whereby it is rotationally fixed with respect to said hub element.

A carrier 130 is mounted on the spindle 111 between the gears 120 and 126, being fixed to rotate with said spindle by means, for instance, of a Woodruff key 131. Said carrier is provided with one or more radially projecting studs 132, upon each of which is journalled a bevelled pinion 133, meshing with the gears 120 and 126 to provide a differential driving connection between the spindle 111 and said gears. Since the disc 116 is rotationally fixed with respect to the gear 120 and the disc 128 is rotationally fixed with respect to the gear 126, of course the discs 116 and 128 are thus differentially drivingly connected with the shaft or spindle 111. That is, the disc 116 may continuously rotate at a speed greater than, or less than, the speed of the disc 128 while power is continuously transmitted between the shaft 111 and both discs; and the expression "differentially driving" is used herein always to define an association which will permit such operation.

A thrust bearing 134 having a bearing housing 135 is suitably secured to the hub portion 129 of the disc 128; and a lever 136 is formed and arranged to straddle the bearing housing 135 and is pivotally connected therewith, as at 137. The upper end of the lever 136 may be suitably pivotally mounted at 138 upon a fixed fulcrum. In the illustrated assembly, a screw shaft 139 is shown adjacent the lower end of the lever 136, said screw shaft being suitably journalled in a bearing 140 and carrying a nut 141 provided with oppositely projecting pins 142 received in slots 143 in the bifurcated lower end of the lever 136. As shown, stops 144, 144 are adjustably mounted on the screw shaft 139 to limit the reciprocatory movement of the nut 141.

As shown, and preferably, the longitudinal extent of the hub element 122, and the depth of the socket 125, are such that the carrier 130 and pinions 133 are substantially completely enshrouded within the socket 125.

The pulley 115 comprises a coned disc 145 generally similar to the disc 116. Said disc 145 carries, in its hub portion, a screw 146 whose reduced nose is received in a groove 147 in the driven shaft 113, whereby the disc 145 is held against axial movement relative to said shaft, but is free to rotate relative thereto. Centrally of its coned face, the disc 145 is provided with a coaxial socket 148 in which is received a bevelled gear 149 secured in place therein by one or more headed machine screws 150.

A hub element 151 is similarly journalled on the shaft 113, said hub element carrying a screw 152 whose reduced nose is received in an annular groove 153 in the shaft 113, whereby said hub element 151 is held against axial movement relative to said shaft, but is free for rotational movement relative thereto. In its end adjacent the gear 149, the hub element 151 is formed with an elongated, coaxial socket 154 in which is received a bevelled gear 155, fixed therein by means of one or more headed machine screws 156.

A second coned disc 157 is mounted upon the hub element 151 in mating relation to the disc 145, and is provided with a rearwardly projecting hub portion 158 whose axial extent is at least equal to the length of the path of reciprocation of said disc 157 relative to the hub element 151, and which has bearing on said hub element substantially throughout its length. The disc 157 is suitably keyed or splined to the hub element 151, whereby said disc is free to reciprocate relative to said hub, but is held against rotation relative thereto.

A carrier 159 is mounted upon the shaft 113 between the gears 149 and 155, and is fixed to rotate with said shaft by means, for instance, of a Woodruff key 160. Said carrier includes one or more radially projecting studs 161, upon each of which is journalled a bevelled pinion 162 meshing with the gears 149 and 155, whereby a differential drive connection between the shaft 113 and the gears 149 and 155 is provided. Since the disc 145 is rotationally fixed with respect to the gear 149 and the disc 157 is rotationally fixed relative to the gear 155, of course the discs are thus differentially drivingly connected with the shaft 113.

An abutment element 163 is threadedly connected to the right hand end of the hub element 151, as viewed in Fig. 1, and said element 163 may perferably be fixed to said hub element by means of a screw 164. The abutment element is provided with an axially extending skirt 165 which is telescopically associated with an annular shield 166 having an inturned toe 167 which bears against an outwardly facing surface on the disc 157. A coiled spring 168 is confined between the toe 167 of the shield 166 and the abutment member 163. An antifriction bearing 169 is preferably interposed between one end of the spring 168 and its associated abutment. The spring 168, of course, constantly urges the disc 157 resiliently toward the disc 145.

A V-belt 170 provides a driving connection between the pulley 112 and the pulley 115. Preferably, but not necessarily, the discs of each pulley are so associated with the carrier of that pulley that, when the belt 170 is in the median position illustrated, the discs of each pulley will be equally axially spaced from the plane including the axes of the studs of the associated carrier members.

It will be clear, of course, that if the lever 136 is moved in a counter-clockwise direction, as viewed in Fig. 1, the disc 128 will thereby be forced toward the disc 116 to "squeeze" the belt 170 outwardly between the said discs, thereby increasing the effective diameter of the pulley 112. At the same time, the belt will be pulled more deeply between the discs 145 and 157, forcing the disc 157 toward the right against the tendency of the spring 168, to decrease the effective diameter of the pulley 115, thereby increasing the speed of the shaft 113 with respect to the speed of the spindle 111. Because of the differential drive connection between the spindle 111 and the discs 116 and 128, and the differential drive connection between the shaft 113 and the discs 145 and 157, inequalities arising for the reasons above outlined will be compensated, the bucking effects within the body of the belt 170 will be overcome, and yet both discs of both pulleys will participate continuously in the transmission of power from the spindle 111 to the shaft 113.

In the form of my invention illustrated in Fig. 2, it will be seen that I have indicated, in fragmental elevation, a motor 10 having a spindle 11 upon which is supported an expansible V-pulley, indicated generally by the reference numeral 12. A driven shaft 13, which may be an element of a machine 14 of any type, carries a resiliently expansible V-pulley, indicated generally by the reference numeral 15.

The pulley 12 comprises a coned disc 16 having an elongated coaxial hub 17 projecting from the coned face thereof. A mating coned disc 18 is journalled on the hub 17 for coaxial reciprocatory and rotational movement relative to the disc 16; and said disc 18 is provided with a hub 19 projecting away from the disc 16. Near its distal end, the hub 17 is formed to provide an annular series of teeth 20; and the hub 19 is provided, on its internal surface, with an annular series of axially elongated teeth 21. As will be clear from inspection, the hub 19 is so formed that the teeth 21 are radially spaced from the the teeth 20 of the hub 17, and that the tooth-bearing portion of the hub 19 enshrouds the teeth 20.

A carrier 22 is supported at the distal end of the spindle 11, and may be secured against rotation relative to said spindle by a Woodruff key 23, and against axial movement relative to the spindle by a pointed set screw 24. One or more planetary gears 25 (preferably three) are eccentrically carried by the carrier 22 within the region in which the teeth 20 are formed, said gears meshing with the teeth 20 and with the teeth 21 to provide a differential drive connection between the discs 16 and 18 and the spindle 11.

The spindle 11 is formed with a peripheral groove 26 in which is received the nose of a screw 27 penetrating the hub 17 whereby the disc 16 is held against axial movement relative to the spindle, but is free for rotational movement relative to said spindle. A thrust bearing 28 bears against a shoulder 29 on the hub 19, and is confined in place by a spring ring 30. A bearing housing 31 is formed with a shoulder 32 bearing against one end of the bearing 28, and is confined with respect to the bearing by a spring ring 33. A yoke 34, pivotally connected with the housing 31, is pivotally mounted at 35 upon a fixed support, and, at its opposite end, is bifurcated as at 36 to cooperate with pins 37 projecting from a nut 38 threadedly mounted upon an adjusting shaft 39 journalled in a fixed bearing 40.

It will be seen that the carrier 22, being keyed to the spindle 11, will be driven with said spindle; and that said carrier, together with its planetary gears 25 which mesh with the tooth series 20 and with the tooth series 21, will provide a differential drive to the discs 16 and 18, whereby any tendency of the discs to drive unequally upon the belt 63, for the reasons above outlined, will be compensated, while both discs will continually exert a driving force upon the belt.

The pulley 15 is similarly connected to the shaft 13. Said pulley comprises a disc 41 similar to the disc 16 and having an elongated coaxial hub 42 projecting from its coned face. A mating disc 43 is mounted upon the hub 42 for reciprocation and rotation relative to the hub 42, and is provided with a hub 44 projecting away from the disc 41. The hub 42 is formed, at its distal end, with an annular series of external teeth 45; and the hub 44 is provided, in a similar region, with an annular series of axially elongated teeth 46. The hub 44 is so proportioned and designed that the teeth 46 are radially spaced from the teeth 45, and that the toothed portion of the hub 44 enshrouds the tooth series 45 of the hub 42. A carrier 47 is secured to the distal end of the shaft 13 by a Woodruff key 48 and a pointed set screw 49; and said carrier carries one or more (preferably three) planetary gears 50 which are supported within the region between the teeth 45 and 44, and mesh with both of said series of teeth.

The shaft 13 is preferably formed with a peripheral groove 51 in which is received the nose of a screw 52 penetrating the hub 42 to hold the disc 41 against axial movement relative to the shaft 13, while permitting relative rotational movement thereof.

An abutment member 53 is secured externally to the carrier 47 and is retained there by a screw 54. Said element 53 carries a skirt 55 which is telescopically associated with an annular shield 56 having an inturned toe 57 bearing against an external shoulder 58 on the disc 43, and forming an abutment for one end of a spring 59 confined between the disc 43 and the abutment element 53. Preferably, an antifriction bearing 60 is interposed between one end of the spring and the associated abutment element. As shown, one race 61 of the bearing 60 engages the abutment element 53, while the other race 62 supports the outer end of the spring 59.

A V-belt 63 provides a driving connection between the pulley 12 and the pulley 15. It will be seen that, because of the differential drive connection between the shaft 13 and the discs 41 and 43, and the differential drive connection between the spindle 11 and the discs 16 and 18, inequalities arising for the reasons above-outlined will be compensated.

Tests have shown that, as the speed of a conventional transmission of the general character of that herein illustrated, increases, the power output rises rapidly until the speed reaches one-half to two-thirds the rated speed of the unit, and then level off and actually begins to drop just before rated speed is attained. With the pulleys of the present disclosure substituted for conventional expansible V-pulleys, however, the rise in power output continues to increase substantially to the rated speed of the unit; and the output of the unit at rated speed substantially accords with the theoretical power capacity, as determined by the formula above mentioned, in contrast to similar systems using conventional pulleys, in which the power output capacity is only approximately 50% of that indicated by the formula.

I claim as my invention:

1. A V-pulley comprising a first coned disc, a second coned disc mounted for coaxial rotation relative to said first coned disc, and planetary means providing a driving connection between said coned discs.

2. A V-pulley comprising a first coned disc having a hub, a second disc mounted for coaxial rotation relative to said first disc and having a hub, an annular series of teeth on each of said disc hubs, a carrier mounted for rotation on the common axis of said discs, and gear means eccentrically carried by said carrier and mehing with said teeth series of both disc hubs.

3. An expansible V-pulley comprising a first coned disc having a hub provided with an annular series of teeth, a second coned disc journalled on said hub for reciprocation and rotation relative to said first disc, said second disc being provided with an annular series of teeth, a carrier mounted for rotation about the axis of said hub, and gear means eccentrically carried by said carrier and meshing with both of said series of teeth.

4. An expansible V-pulley comprising a first coned disc having a coaxial, elongated hub projecting from its coned face, a second coned disc axially reciprocably and rotationally mounted on said hub of said first disc and having a hub projecting from its face remote from said disc, an annular series of teeth externally carried on said first disc hub in a region remote from the coned face of said first disc, an annular series of teeth internally carried on said second disc hub and enshrouding said first-named series of teeth in radially-spaced relation thereto, a carrier mounted for rotation about the axis of said first disc hub, and a gear eccentrically carried by said carrier, received between said hubs and meshing with both of said series of teeth.

5. The pulley of claim 4 in which one of said series of teeth is axially elongated and slidably meshed with said gear, and means restraining relative axial reciprocation between said gear and the other of said series of teeth.

6. A resiliently-expansible V-pulley comprising a first coned disc having a coaxial, elongated hub projecting from its coned face, a second coned disc axially reciprocably and rotationally mounted on said hub of said first disc and having a hub projecting from its face remote from said first disc, an annular series of teeth externally carried on said first disc hub in a region remote from the coned face of said first disc, an annular series of teeth internally carried on said second disc hub and enshrouding said first-named series of teeth in radially-spaced relation thereto, a carrier mounted for rotation about the axis of said first disc hub, a gear eccentrically carried by said carrier, received between said hubs and meshing with both of said series of teeth, means restraining relative axial reciprocation between said carrier and said first disc, and a coiled spring confined between said carrier and said second disc and urging the coned face of said second disc toward the coned face of said first disc.

7. The pulley of claim 6 including anti-friction bearing means interposed between one end of said spring and the adjacent confining member.

8. The pulley of claim 6 including anti-friction bearing means interposed between said carrier and said spring.

9. In combination, a shaft, a first coned disc mounted on said shaft for rotation about the axis thereof, means restraining said disc against axial reciprocation relative to said shaft, a second coned disc mounted for coaxial rotation and reciprocation relative to said shaft, and planetary gear means including a carrier fixed to said shaft and carrying a gear meshing with teeth on said discs to provide a differential driving connection between said shaft and said discs.

10. In combination, a shaft, a first coned disc mounted on said shaft, means cooperating with said disc and said shaft to inhibit relative reciprocation thereof while permitting relative rotation thereof, a second coned disc mounted for coaxial reciprocation and rotation relative to said first disc, and planetary means fixedly supported on said shaft and establishing a differential driving connection between said discs.

11. A speed-varying power transmission comprising an input shaft and an output shaft, an expansible V-pulley on said input shaft comprising a first coned disc, a second coned disc mounted for coaxial reciprocation and rotation relative to said first disc, means for differentially connecting said discs through said input shaft, a second expansible V-pulley on said output shaft comprising a first coned disc, a second coned disc mounted for coaxial reciprocation and rotation relative to said first disc of said second pulley, planetary means providing a driving connection between the discs of said second pulley, and a V-belt providing a driving connection between said pulleys.

12. The transmission of claim 1 including actuating means operatively associated with the second disc of one of said pulleys for positively shifting said second disc toward its mating first disc, and spring means operatively associated with the second disc of the other of said pulleys and resiliently urging the same toward its mating first disc.

13. A speed-varying power transmission comprising an input shaft and an output shaft, a first expansible V-pulley on said input shaft comprising a first coned disc having a hub, means cooperating with said disc and said shaft to inhibit relative reciprocation thereof while permitting relative rotation thereof, a second coned disc journalled on said hub for reciprocation and rotation relative to said first disc, said hub being provided with an annular series of teeth and said second disc being provided with an annular series of teeth, a carrier fixed to said shaft, gear means eccentrically carried by said carrier and meshing with both of said series of teeth, a second expansible V-pulley on said output shaft comprising a first coned disc having a hub, means cooperating with said disc and said output shaft to inhibit relative reciprocation thereof while permitting relative rotation thereof, a second disc journalled on said hub for reciprocation and rotation relative to said first disc of said second pulley, said hub of said second pulley being provided with an annular series of teeth and said second disc of said second pulley being provided with an annular series of teeth, a carrier fixed to said output shaft, gear means eccentrically carried by said carrier and meshing with both of said series of teeth of said second pulley, a V-belt providing a driving connection between said pulleys, and means for determining the positions of axial adjustment of said second discs of said pulleys relative to said first discs thereof.

14. A speed-varying power transmission comprising an input shaft and an output shaft, a first expansible V-pulley on said input shaft comprising a first coned disc having a coaxial elongated hub projecting from its coned face, means cooperating with said disc and said shaft to inhibit relative reciprocation thereof while permitting relative rotation thereof, a second coned disc journalled on said hub for reciprocation and rotation relative to said first disc and having a hub projecting from its face remote from said first disc, an annular series of teeth externally carried on said first disc hub in a region remote from the coned face of said first disc, an annular series of teeth internally carried on said second disc hub and enshrouding said first-named series of teeth in radially spaced relation thereto, a carrier fixed to said shaft, a gear eccentrically carried by said carrier, received between said hubs and meshing with both of said series of teeth, a second expansible V-pulley on said output shaft comprising a first coned disc having a coaxial, elongated hub projecting from its coned face, means cooperating with said disc and said output shaft to inhibit relative reciprocation thereof while permitting relative rotation thereof, a second coned disc journalled on said hub for reciprocation and rotation relative to said first disc of said second pulley, and having a hub projecting from its face remote from said first disc of said second pulley, an annular series of teeth externally carried on said first disc hub in a region remote from the coned face of said first disc, an annular series of teeth internally carried on said second disc hub and enshrouding said first-named series of teeth in radially-spaced relation thereto, a carrier fixed to said output shaft, a gear eccentrically carried by said carrier, received between said hubs and meshing with both of said series of teeth of said second pulley, a V-belt providing a driving connection between said pulleys, and means for determining the positions of axial adjustment of said second discs of said pulleys relative to said first discs thereof.

15. A speed-varying power transmission comprising an input shaft and an output shaft, a first expansible V-pulley on said input shaft comprising a first coned disc having a coaxial, elongated hub projecting from its coned face, means cooperating with said disc and said shaft to inhibit relative reciprocation thereof while permitting relative rotation thereof, a second coned disc journalled on said hub for reciprocation and rotation relative to said first disc and having a hub projecting from its face remote from said first disc, an annular series of teeth externally carried on said first disc hub in a region remote from the coned face of said first disc, an annular series of teeth internally carried on said second disc hub and enshrouding said first-named series of teeth in radially-spaced relation thereto, a carrier fixed to said shaft, a gear eccentrically carried by said carrier, received between said hubs and meshing with both of said series of teeth, a resiliently-expansible V-pulley mounted on said output shaft and comprising a first coned disc having a coaxial, elongated hub projecting from its coned face, a second coned disc axially reciprocably and rotationally mounted on said hub of said first disc and having a hub projecting from its face remote from said first disc, an annular series of teeth externally carried on said first disc hub in a region remote from the coned face of said first disc, an annular series of teeth internally carried on said second disc hub and enshrouding said first-named series of teeth in radially-spaced relation thereto, a carrier fixed to said output shaft, a gear eccentrically carried by said carrier, received between said hubs of said second pulley and meshing with both of said series of teeth thereof, a coiled spring confined between said second disc of said second pulley and said carrier and urging the coned face of said second disc toward the coned face of said first disc of said second pulley, a V-belt providing a driving connection between said pulleys, and means manipulable to determine the position of axial adjustment of said second disc of said first pulley relative to the first disc thereof.

16. In combination, a shaft, a first coned disc mounted on said shaft for rotation about the axis thereof, means restraining said disc against axial reciprocation relative to said shaft, said disc being centrally provided with a coaxial bevelled gear exposed in the direction of its coned face, a hub element mounted on said shaft for rotation about the axis thereof and having a transaxial surface axially spaced from and facing said gear, means restraining said hub element against axial reciprocation relative to said shaft, said hub element being provided, at said transaxial face, with a bevelled gear facing said first-named gear, means providing a differential driving connection between said shaft and said gears including a carried fixed to said shaft between said gears and eccentrically carrying a pinion meshing with said gears, a second coned disc supported on said hub element in mating relation to said first disc for reciprocation toward and away from said first disc, and means restraining said second disc against rotational movement relative to said hub element.

17. In combination, a shaft, a first coned disc mounted on said shaft for rotation about the axis thereof, means restraining said disc against axial reciprocation relative to said shaft, said disc being centrally provided with a coaxial socket opening through its coned face, a bevelled gear received in said socket and rotationally fixed to said disc, a hub element mounted on said shaft for rotation about the axis thereof and provided with a coaxial socket opening through its end adjacent said disc, a bevelled gear received in said last-named socket and rotationally fixed to said hub element, means providing a differential driving connection between said shaft and said gears including a carrier fixed to said shaft between said gears and eccentrically carrying a pinion meshing with said gears, said carrier and said pinion being partially enshrouded in at least one of said sockets, a second coned disc supported on said hub element in mating relation to said first disc for reciprocation toward and away from said first disc, and means restraining said second disc against rotational movement relative to said hub element.

18. In combination, a shaft, a first coned disc mounted on said shaft for rotation about the axis thereof, means restraining said disc against axial reciprocation relative to said shaft, said disc being centrally provided with a coaxial bevelled gear exposed in the direction of its coned face, a hub element mounted on said shaft for rotation about the axis thereof and having a transaxial surface axially spaced from and facing said gear, means restraining said hub element against axial reciprocation relative to said shaft, said hub element being provided, at said transaxial face, with a bevelled gear facing said first-named gear, means providing a differential driving connection between said shaft and said gears including a carrier fixed to said shaft between said gears and eccentrically carrying a pinion meshing with said gears, a second coned disc supported on said hub element in mating relation to said first disc for reciprocation toward and away from said first disc, said second disc being provided with a rearwardly-extending hub portion having an axial extent at least equal to the length of the reciprocatory path of said second disc relative to said hub element, said disc hub portion having bearing upon said hub element substantially throughout its length in some positions of said disc, and means restraining said second disc against rotational movement relative to said hub element.

References Cited in the file of this patent
UNITED STATES PATENTS

| | | |
|---|---|---|
| 2,092,469 | Oslund | Sept. 7, 1937 |
| 2,298,535 | Krag | Oct. 13, 1942 |
| 2,607,235 | Ruegenberg | Aug. 19, 1952 |
| 2,678,566 | Oehrli | May 18, 1954 |

UNITED STATES PATENT OFFICE

CERTIFICATE OF CORRECTION

Patent No. 2,803,143 August 20, 1957

John S. Michie

It is hereby certified that error appears in the printed specification of the above numbered patent requiring correction and that the said Letters Patent should read as corrected below.

Column 6, line 31, for "mehing" read -- meshing --; line 45, for "said disc" read -- said first disc --; column 7, line 39, for the claim reference numeral "1" read -- 11 --; column 9, line 12, for "carried" read -- carrier --.

Signed and sealed this 8th day of October 1957.

(SEAL)

Attest:
KARL H. AXLINE
Attesting Officer

ROBERT C. WATSON
Commissioner of Patents